M. A. GULLICKSON.
FIELD FLOAT.
APPLICATION FILED JUNE 28, 1915.

1,158,803.

Patented Nov. 2, 1915.

Witnesses
J. J. Campbell

Inventor
M. A. Gullickson,
By Samuel Amick,
Attorney

UNITED STATES PATENT OFFICE.

MARTIN A. GULLICKSON, OF MINNEAPOLIS, MINNESOTA.

FIELD-FLOAT.

1,158,803. Specification of Letters Patent. Patented Nov. 2, 1915.

Application filed June 28, 1915. Serial No. 36,885.

*To all whom it may concern:*

Be it known that I, MARTIN A. GULLICKSON, citizen of the United States, residing at 810 Twenty-second avenue south, Minneapolis, in the county of Hennepin and State of Minnesota, have invented certain new and useful Improvements in Field-Floats, of which the following is a specification.

This invention relates to field floats and it has for its object the provision of an improved float constructed in such manner that it may be very economically manufactured and will comprise elements adapted to reduce the soil to the desired degree of fineness with a minimum of labor.

Further objects and advantages of the invention will be set forth in the detailed description which now follows.

Figure 1:
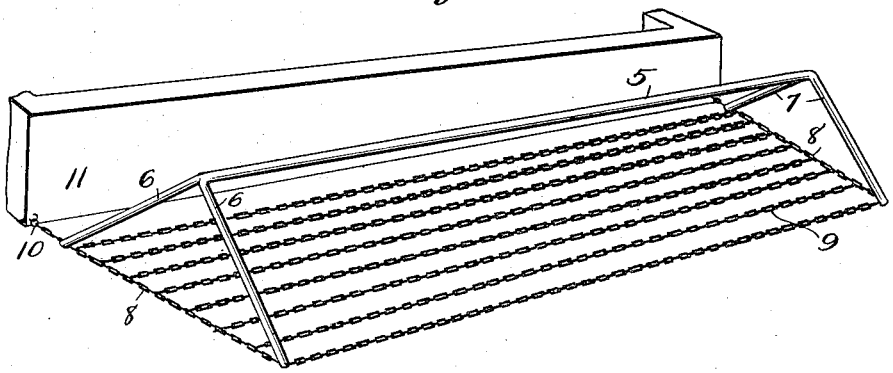
Figure 2:
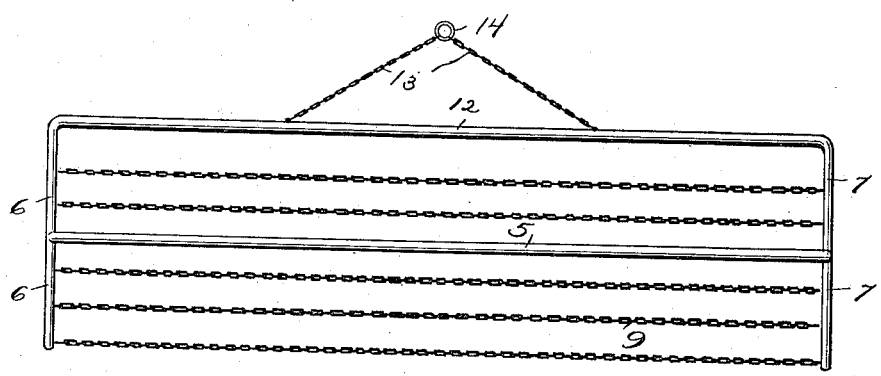

In the accompanying drawing Figure 1 is a perspective view of one form of the invention and Fig. 2 is a plan view showing a slightly modified form.

The float forming the subject matter of the present invention comprises a spreader bar 5, having forked ends 6 and 7. These forked ends are down-turned to lie in substantially vertical planes and the extremities of the members of each of the forked ends are connected by chains 8. Additional chains 9 extend between, and are supported by the chains 8. The chains 8 in Fig. 1 are extended slightly beyond their point of connection with the forked ends 6 and 7, and are provided with rings or other fastening devices, indicated at 10, to adapt them to be attached to a frame 11. The specific construction of the parts carried by this frame has been made the subject matter of a Patent, No. 1,146,155, granted to me, July 13, 1915.

The construction shown in Fig. 2 is the same as that shown in Fig. 1 except that in the case of Fig. 2, a cross bar 12 extends in substantial parallelism with the spreader bar 5, this cross bar 12 connecting the forked ends of said spreader bar. Chains or cables 13, and ring 14 in this case provide means for attaching the structure to a frame, corresponding to frame 11.

It will be apparent that the float herein shown and described may be readily and economically manufactured from materials obtainable in any blacksmith shop. The spreader bar 5 with its forked ends 6 and 7 keeps the chains 9 sufficiently extended so that what is substantially a mat of chain is drawn across the land, and the links of the chains grind the clods to the desired degree of fineness to present a good seed bed.

While the elements shown and described are well adapted to serve the purposes for which they are intended, it is to be understood that the invention is not limited to the precise construction set forth, but includes within its purview whatever is new that comes within the spirit of the appended claims.

Having described my invention, what I claim is:—

1. In a device of the character described the combination with a spreader bar, having down-turned ends, of a chain structure supported between the down-turned ends of said spreader bar.

2. A device of the character described comprising spreader bar having down-turned forked ends, and a structure, comprising a plurality of strands supported from said forked ends.

3. A device of the character described comprising a spreader bar having down-turned forked ends, elements extending between the extremities of said forked ends and a plurality of strands connected to said elements.

4. A device of the character described comprising a spreader bar having down-turned forked ends, elements extending between the extremities of said forked ends and a plurality of chains connected to said elements.

5. A device of the character described comprising a spreader bar having down-turned forked ends, chains extending between and slightly beyond the members constituting each of said forked ends, additional chains extending between and secured to the first named chains, and attaching means carried by those portions of the first named chains which extend beyond the members of said forked ends.

In testimony whereof I affix my signature in the presence of two witnesses.

MARTIN A. GULLICKSON.

Witnesses:
NOTA PAPAZIAN,
W. O. PARROTT.